United States Patent

Polinsky et al.

[11] Patent Number: 5,287,738
[45] Date of Patent: Feb. 22, 1994

[54] SENSOR SYSTEM FOR ANTILOCK BRAKES

[75] Inventors: Mark A. Polinsky, Torrington; James A. Hilby, Litchfield; Michael C. Brauer, Goshen, all of Conn.

[73] Assignee: The Torrington Company, Torrington, Conn.

[21] Appl. No.: 969,659

[22] Filed: Oct. 30, 1992

[51] Int. Cl.⁵ ............................................ G01M 19/00
[52] U.S. Cl. .................................. 73/118.1; 384/448
[58] Field of Search .......... 73/118.1; 324/174, 207.25; 384/448

[56] References Cited

U.S. PATENT DOCUMENTS

| 4,864,231 | 9/1989  | Okumura et al. | 324/173 |
| 4,904,936 | 2/1990  | Richmond | 324/174 |
| 4,954,775 | 9/1990  | Richmond | 324/174 |
| 4,969,753 | 11/1990 | Kato et al. | 384/448 |
| 4,988,220 | 1/1991  | Christiansen et al. | 384/448 |
| 5,011,302 | 4/1991  | Mott et al. | 384/448 |
| 5,157,966 | 10/1992 | Lugosi et al. | 73/118.1 |

Primary Examiner—Jerry W. Myracle
Attorney, Agent, or Firm—John C. Bigler

[57] ABSTRACT

A target carrier is clamped between a constant velocity joint and a spindle bearing inner race such that an encoded target mounted on the target carrier rotates with a wheel spindle over which the spindle bearing inner race is mounted. A sensor probe is mounted on a steering knuckle within which the constant velocity joint is mounted for the encoded target and for generating a signal indicative of rotation of the wheel spindle. The target carrier may be held by a capturing cup before installation of the constant velocity joint and may serve as a pilot during installation of the constant velocity joint.

24 Claims, 4 Drawing Sheets

SENSOR SYSTEM FOR ANTILOCK BRAKES

BACKGROUND OF THE INVENTION

This invention relates generally to sensor systems and, more particularly, to sensor systems for determining the rotation of shafts and axles for vehicles and other applications.

Antilock braking systems and traction control systems are now commonplace in the automotive marketplace and are standard equipment on many car models. The basis of these systems is a sensor system that senses wheel speed or rotation and relays that information to a controller. The controller dictates, for example, the application of braking force intermittently to keep a respective wheel from skidding or slipping. Such use of the braking system allows vehicles to remain in control during maximum braking and to stop more efficiently. Similarly, controllers can dictate the application of driving force for optimum traction.

Current sensor systems for antilock brakes and traction control are of three types: 1) non-integrated variable reluctance type, 2) integrated hub assembly type, and 3) integrated spindle sensor bearing type. Non-integrated variable reluctance sensors often require adjustment after installation. Integrated hub assembly units require a large number of individual parts, introducing problems relating to inventory, installation and serviceability of those parts. Integrated spindle sensor bearings can limit an automotive manufacturer to a single supplier and may require new bearing designs to incorporate the sensor and encoder.

The foregoing illustrates limitations known to exist in present sensor systems for antilock brakes and the like. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a sensor system for antilock brakes and the like comprising an encoded target, target mounting means, and probe means. The target mounting means is adapted to be clamped between a constant velocity joint and a spindle bearing inner race, such that the encoded target rotates with a wheel spindle over which the spindle bearing inner race is mounted. The probe means is adapted to be mounted on a steering knuckle within which the constant velocity joint is mounted, such that the probe means senses the encoded target and generates a signal indicative of rotation of the wheel spindle.

The foregoing and other aspects of the invention will be apparent from the following detailed description of the invention when considered with the accompanying drawing figures.

BRIEF DESCRIPTION OF THE DRAWING FIGURES

In this specification, identical elements in different embodiments are given identical reference characters.

DETAILED DESCRIPTION

Figure 1:
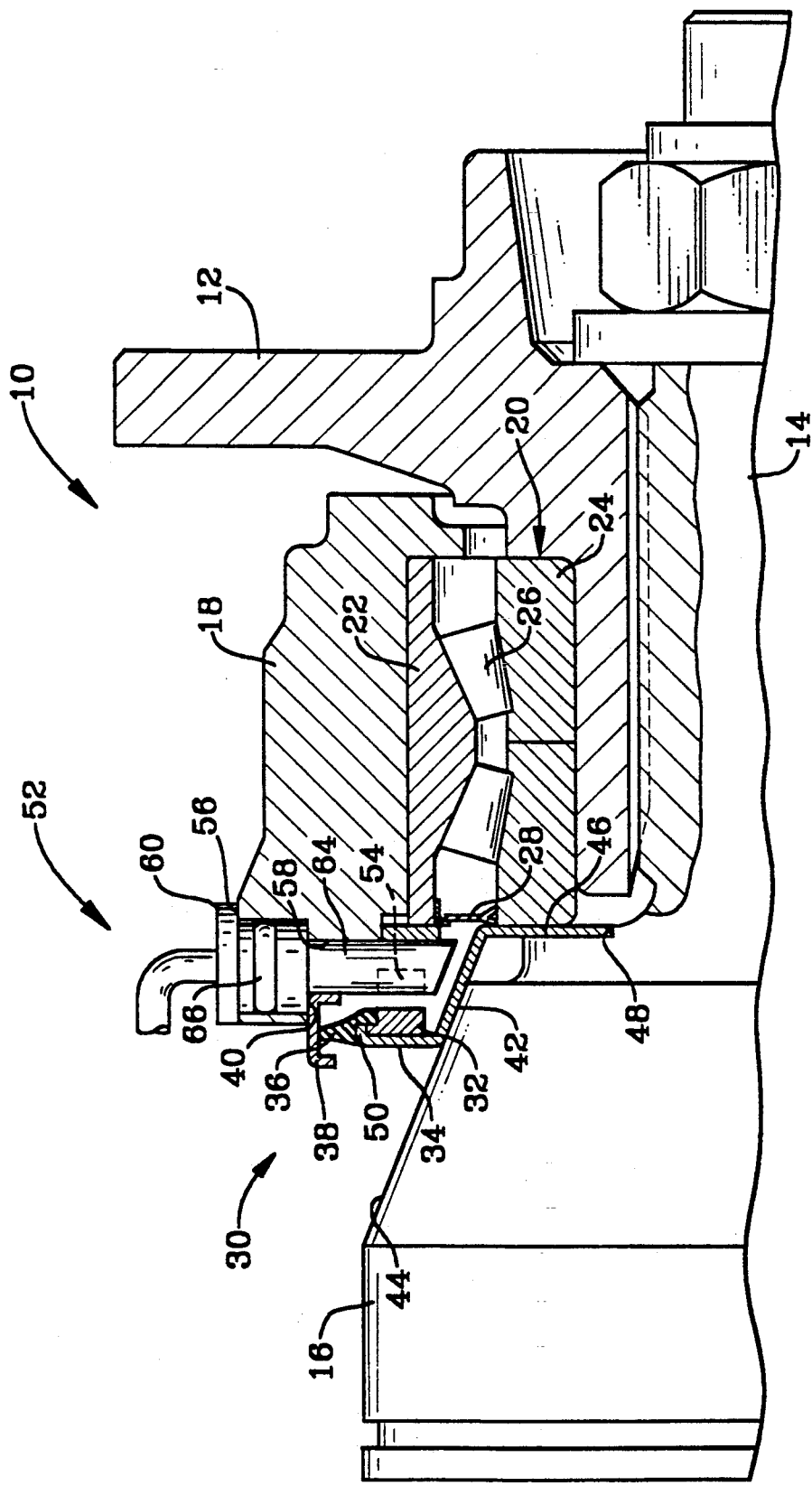
FIG. 1 is a cross sectional view of an automobile hub assembly having a sensor system for antilock brakes and the like installed therein, illustrating one embodiment of the present invention.

Referring now to the drawings, FIG. 1 illustrates a portion of an automobile hub assembly 10 as might be used, for example, on a front wheel drive automobile equipped with antilock brakes. Hub assembly 10 includes wheel hub 12, wheel spindle 14, constant velocity joint 16, and steering knuckle 18. Steering knuckle 18 is supported by the automobile front suspension, not shown, for pivoting by a steering rack and pinion to effect steerage.

Wheel spindle 14 is an extension of constant velocity joint 16 and is mounted in steering knuckle 18 by spindle bearing 20 for rotation relative to steering knuckle 18. Constant velocity joint 16 provides a universal (pivot) coupling to the automobile transmission and transmits power to wheel spindle 14 to effect rotation of a road wheel mounted on wheel hub 12. Spindle bearing 20 includes outer race 22, inner race 24, and rolling elements 26 between the races, and is provided with a spindle bearing seal 28 to retain lubricant and restrict entry of contaminants.

Hub assembly 10 is equipped with a sensor system which includes a magnet subassembly 30 having a magnet 32, magnet carrier 34, and sensor seal 36. Sensor seal 36 serves as a "slinger" and is molded over magnet carrier 34 and a radially outward portion of magnet 32 to hold magnet 32 in place. Capturing cup 38 is a metal ring having a U-shaped cross section with its cylindrical middle portion mounted within counterbore surface 40 of steering knuckle 18. Capturing cup 38 is dimensioned such that the cylindrical middle portion is engaged by sensor seal 36 to effect sealing of the sensor system.

Capturing cup 38 and magnet subassembly 30 are mounted on steering knuckle 18 before constant velocity joint 16 is installed in steering knuckle 18. Specifically, capturing cup 38 is pressfitted, for example, within counterbore surface 40 and subassembly 30 is held by engagement of sensor seal 36 with capturing cup 38 such that magnet carrier 34 is suspended radially inward. Constant velocity joint 16 is subsequently installed within steering knuckle 18 such that magnet carrier 34 pilots magnet subassembly 30 and a portion of subassembly 30 is clamped between constant velocity joint 16 and spindle bearing inner race 24.

In the embodiment of FIG. 1, magnet carrier 34 is formed of metal by pressing, drawing, spinning or other convenient method and is configured with cone portion 42 conforming to an outer surface 44 of constant velocity joint 16. Radially inward edge of cone portion is joined to radial face 46 of magnet carrier 34 that is received within an annular recess 48 in constant velocity joint 16. Magnet carrier 34 has an axially directed lip 50 at its radially outward edge for maintaining radial alignment of magnet 32 and for providing a key surface over which sensor seal 36 is molded.

Although magnet carrier 34 is of a particular annular configuration in FIG. 1, other mounting means may be employed with similar effect. For example, magnet carrier 34 may take the form of a bracket with one or more fingers extending radially inwardly to be clamped between constant velocity joint 16 and spindle bearing inner race 24 by abutment with one of those two elements or by other clamping means. In place of cone portion 42, other shapes may be used to guide magnet subassembly 30 into a desired position concentric to constant velocity joint 16 and wheel spindle 14.

Sensor probe 52 is adapted to be mounted on steering knuckle 18 such that a sensor 54 therein is proximate to magnet 32 for sensing a magnetic field produced by magnet 32 and for generating a signal indicative of rotation of wheel spindle 14. Sensor 54 may be a Hall effect sensor or other known magnetic field sensing device. In the embodiment of FIG. 1, for example, sensor probe 52 is located by a machined boss 56 and is inserted through an aperture 58 in a portion of steering knuckle 18 overlying constant velocity joint 16 and cone portion 42 of magnet carrier 34.

Collar portion 60 overlies machined boss 56 on steering knuckle 18 to provide a stop surface for locating sensor 54 and to provide a barrier to contamination. Reduced diameter portion 64 extends through a counterbore of aperture 58 and terminates in a beveled end at sensor 54. 0-rings 66, provided within an annular groove, are received within the counterbore of aperture 58 to seal out contamination and to provide frictional retention. A bolt (not shown) securing collar portion 60 to steering knuckle 18, or other keying means, may be provided to orient the beveled end and sensor 54 with respect to magnet 32.

Once assembled, the sensor system needs no additional adjustment to ensure proper functioning. Magnet subassembly 30 and sensor probe 52 can be removed to service spindle bearing 20 if necessary. Capturing cup 38 remains pressed in steering knuckle 18 and provides axial location of magnet carrier 34 and, also, a controlled surface for extending the life of sensor seal 36. Sensor probe 52 is highly serviceable since the probe can be removed simply by removing any securing bolt and pulling sensor probe 52 radially outwardly relative to constant velocity joint 16, in the axial direction of aperture 58.

Figure 2:
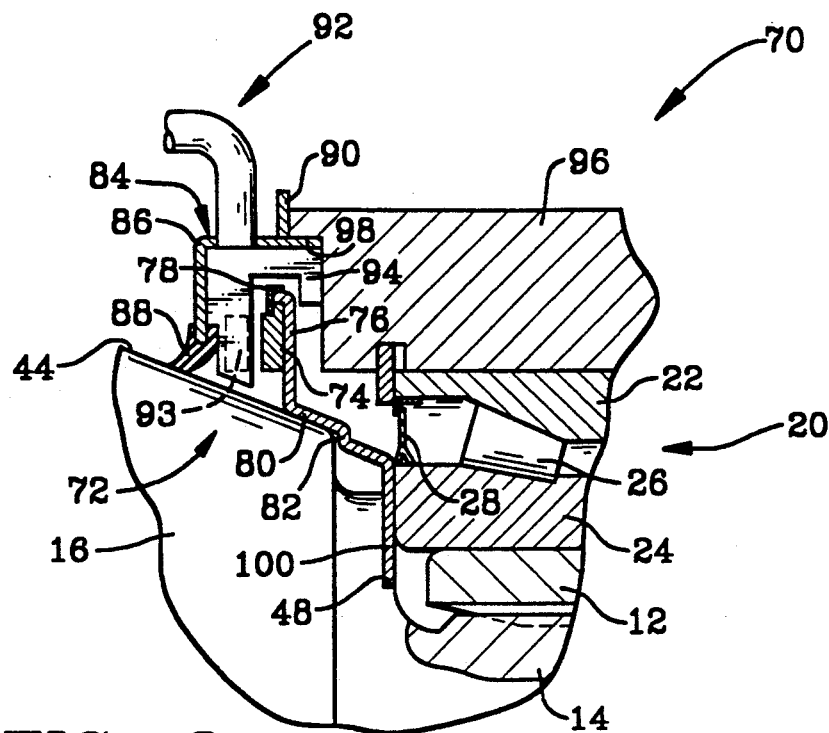
FIG. 2 is a cross sectional view similar to FIG. 1 illustrating a second embodiment of the present invention.

FIG. 2 illustrates a portion of an automobile hub assembly 70 including wheel hub 12, wheel spindle 14, constant velocity joint 16, and spindle bearing 20 common to those of hub assembly 10, described above. Hub assembly 70 is equipped with a sensor system which includes a magnet subassembly 72 comprising magnet 74 and a magnet carrier 76, and a spun-on cup 78 for securing magnet 74 to magnet carrier 76. Magnet carrier 76 has a cone shaped portion 80 and step portion 82 conforming to outer surface 44 of constant velocity joint 16.

Capturing cup 84 comprising a cup ring 86 having an L-shaped cross section, sensor seal 88, and, radially facing bracket 90. Capturing cup 84 is dimensioned such that sensor seal 88 engages outer surface 44 of constant velocity joint 16. Sensor probe 92 is mounted in a slot within capturing cup 84 such that sensor 93 is proximate to magnet 74 to sense a magnetic field produced by magnet 74 to generate a signal indicative of rotation of wheel spindle 14. A resilient guide 94 may be formed in sensor probe 92 to ensure proper axial location of magnet 74. Sensor probe 92 is removable for service by removing capturing cup 84 over magnet subassembly 72 and withdrawing sensor probe 92 radially inwardly from the cup.

Capturing cup 84 and magnet subassembly 30 are mounted on steering knuckle 96 before constant velocity joint 16 is installed. Specifically, capturing cup 84 is press-fitted or bolted, for example, within counterbore surface 98 and magnet subassembly 72 is held by engagement of sensor seal 88 such that magnet carrier 76 is suspended radially inward. Constant velocity joint 16 is subsequently installed within steering knuckle 96 such that magnet carrier 76 pilots magnet subassembly 72 and a radially inwardly extending portion 100 is clamped between constant velocity joint 16 and spindle bearing inner race 24.

Figure 3:
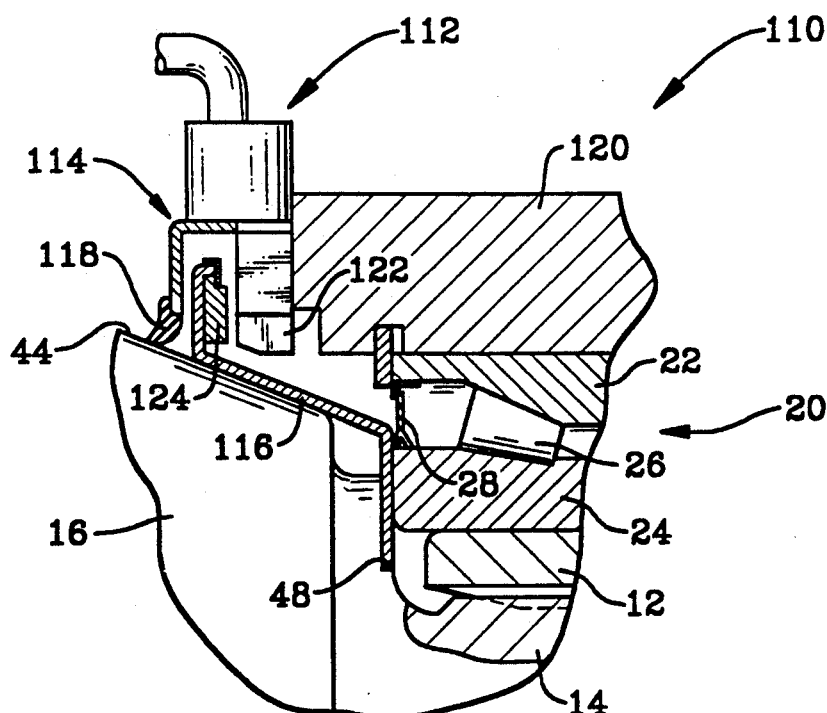
FIG. 3 is a cross sectional view similar to FIG. 1 illustrating a third embodiment of the present invention.

FIG. 3 illustrates a less serviceable embodiment of the present invention as installed within automobile hub assembly 110. This sensor system is less serviceable because removal of constant velocity joint 16 is required for replacement of sensor probe 112. Capturing cup 114 and magnet carrier 116 are similar to those described with respect to the embodiment of FIG. 2. Capturing cup 114 includes a sensor seal 118 and is mounted on steering knuckle 120 in a manner similar to that of the second embodiment. However, in the third embodiment, sensor 122 of sensor probe 112 is positioned between magnet 124 and wheel spindle 14.

Figure 4:
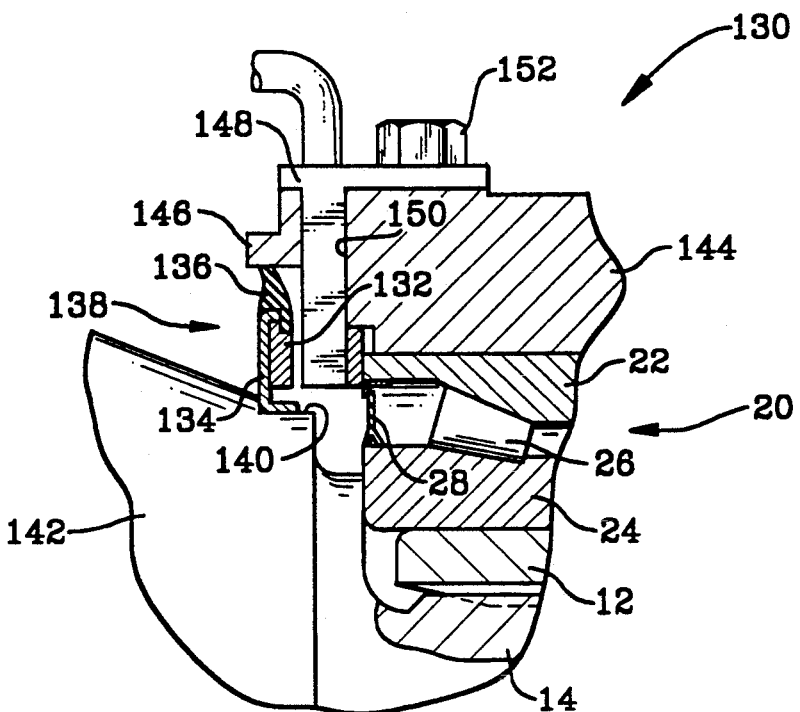
FIG. 4 is a cross sectional view similar to FIG. 1 illustrating a fourth embodiment of the present invention.

FIG. 4 illustrates an embodiment of the present invention installed within automobile hub assembly 130. Magnet 132 is secured to magnet carrier 134 by sensor seal 136 that is overmolded to form magnet subassembly 138. Magnet carrier 134 is pressed onto an annular groove 140 in an outer surface of constant velocity joint 142 before constant velocity joint 142 is installed into steering knuckle 144. Axially extending lip 146 on steering knuckle 144 provides a sealing surface for engagement with sensor seal 136. Sensor probe 148 is inserted through aperture 150 in steering knuckle 144 and secured by bolt 152, to be easily removable for service.

Figure 5:
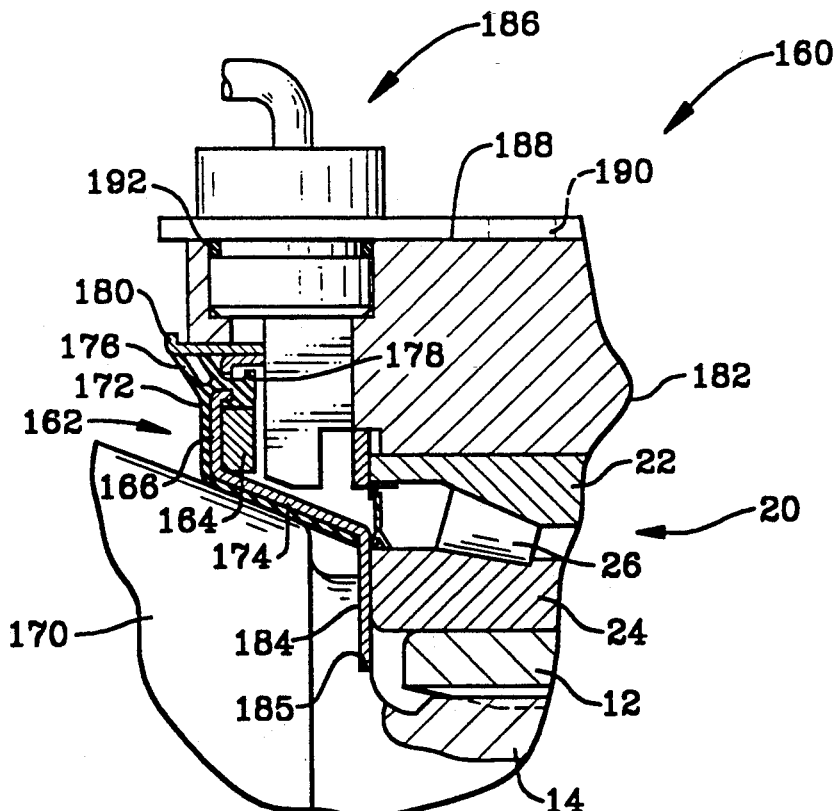
FIG. 5 is a cross sectional view similar to FIG. 1 illustrating a fifth embodiment of the present invention.

FIG. 5 illustrates a fifth embodiment of the present invention installed within automobile hub assembly 160. This sensor system is similar to that of FIG. 1 with magnet subassembly 162 comprising magnet 164, magnet carrier 166 and sensor seal 172 molded over magnet carrier 166. However, sensor seal 172 extends radially inward over cone portion 174 of magnet carrier 166 and extends radially outwardly as two sealing fingers 176. An additional outwardly extending lip 178 provides an interlock with multi-piece capturing cup 180, by entrapping a radially inwardly extending lip of capturing cup 180.

As with the first embodiment, capturing cup 180 and magnet subassembly 162 can be mounted as a single unit on steering knuckle 182 before installation of constant velocity joint 170 such that radially directed portion 184 is clamped between constant velocity joint 170 and inner race 24 in annular recess 185 of constant velocity joint 170. Sensor probe 186 is mounted on machined boss 188 of steering knuckle 182 by a bolt through hole 190 and may be sealed by O-rings 192. Again, Sensor probe 186 is easily removable for service by simply removing the bolt from hole 190 and withdrawing the probe radially outwardly with respect to constant velocity joint 170.

Figure 6:
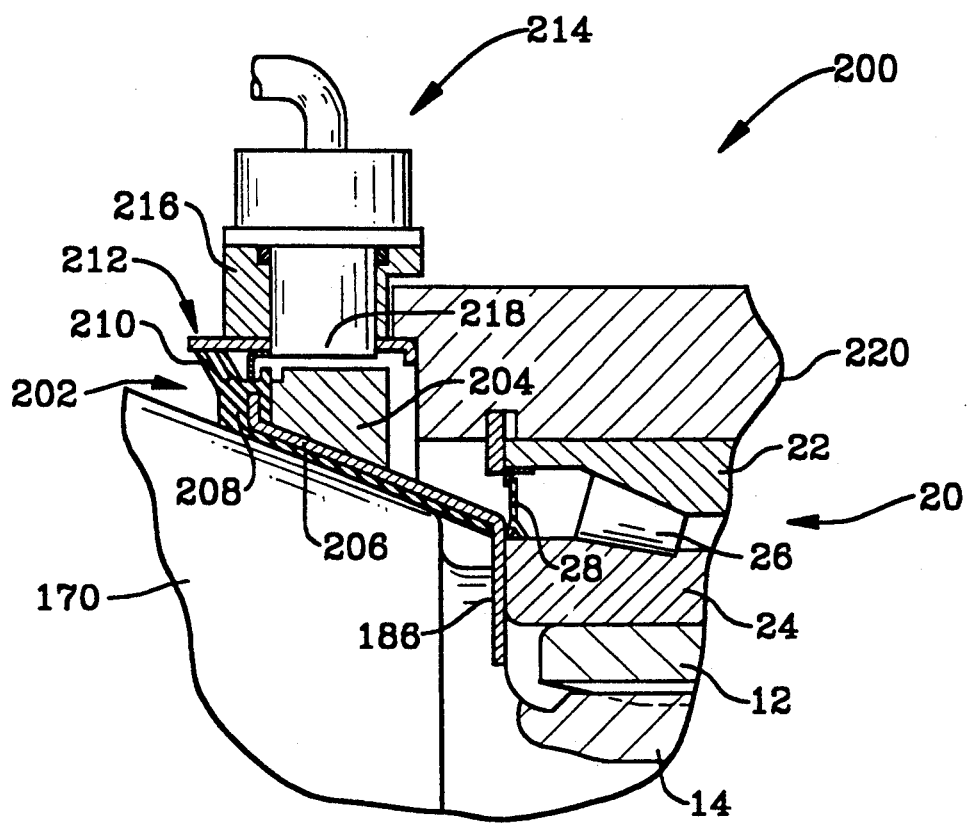
FIG. 6 is a cross sectional view similar to FIG. 1 illustrating a sixth embodiment of the present invention.

FIG. 6 illustrates a sixth embodiment of the present invention installed within automobile hub assembly 200. Magnet subassembly 202 comprises magnet 204, magnet carrier 206, and sensor seal 208 with sealing fingers 210 similar to those of FIG. 5. Sensor seal 208 interlocks with a radially inwardly extending lip of capturing cup 212. Unlike other embodiments, sensor probe 214 is mounted within a sensor mount 216 that is welded or otherwise fixed to capturing cup 212. Another difference is that sensor 218 of sensor probe 214 is radially aligned with respect to magnet 204 rather than axially aligned, as in the configurations of the other embodiments.

Several of these embodiments include a feature that may be considered a "one-piece" design. Specifically, the probe, magnet subassembly, and capturing cup may be handled as a unit and installed on the respective steering knuckle together. This simplifies assembly by reducing the number of separate parts and steps required. For example, in the embodiment of FIG. 6, sensor probe 214 can be inserted in sensor mount 216 of capturing cup 212 before capturing cup is press-fitted or otherwise mounted on steering knuckle 220 Note that this "one-piece" feature is in addition to the ability to remove sensor probe 214 from the sensor system for service.

The magnets of these embodiments may be formed of a resilient rubber-like material with a magnetic filler and molded as a ring. A magnet of that type may be bonded to the magnet carrier. A suitable sensor probe for such magnet could be a Hall effect sensor. In addition, the present invention may employ other encoded targets and probe means. For example, a variable reluctance sensor may be used with an encoded target comprising a toothed wheel or other form having alternating metal and non-metal portions. A magnetoresistive probe may also be used. However, some of these sensor probes may require more adjustment after installation than others.

The present invention provides a sensor system for antilock brakes which solves the problems relating to adjustment, inventory, serviceability, sourcing and design requirements of prior designs. The sensor system disclosed herein is a stand alone sensing system for antilock braking systems and the like that minimizes the amount of modifications necessary to existing bearings and wheel spindles, is easily serviceable, and requires no adjustment after installation. Each of the illustrated embodiments uses an axially or radially oriented magnet, assembled to a formed piece of metal to provide a bracket that is fixed with respect to the rotatable wheel spindle.

Although the invention has been particularly shown and described with reference to preferred embodiments, it will be understood by those skilled in the art that the foregoing and other changes in form and details may be made therein without departing from the spirit and scope of the invention, as defined by the claims appended hereto.

We claim:

1. A sensor system for use with an antilock brake, constant velocity joint, spindle bearing inner race and steering knuckle, the sensor system comprising:
    an encoded target;
    target mounting means, adapted to be clamped between said constant velocity joint and said spindle bearing inner race, for mounting the encoded target for rotation with said wheel spindle over which the spindle bearing inner race is mounted; and
    probe means, adapted to be mounted on said steering knuckle within which the constant velocity joint is mounted, for sensing the encoded target and for generating a signal indicative of rotation of the wheel spindle.

2. The sensor system according to claim 1, wherein the probe means is removable from the steering knuckle for service without removal of the constant velocity joint from the steering knuckle.

3. The sensor system according to claim 1, wherein the mounting means includes a target carrier comprising a metal ring configured to fit against an outer surface of the constant velocity joint.

4. The sensor system according to claim 1, wherein the encoded target is a magnet and wherein the probe means senses a magnetic field produced by the magnet to generate the signal indicative of rotation.

5. The sensor system according to claim 1, wherein the probe means is a variable reluctance sensor.

6. A method of mounting a sensor system for use with an antilock brake, constant velocity joint, spindle bearing inner race and steering knuckle, the method comprising:
    providing a capturing cup and a subassembly, the subassembly including an encoded target and a target carrier;
    mounting the capturing cup on said steering knuckle, before said constant velocity joint is installed in the steering knuckle, such that the subassembly is captured by the capturing cup;
    installing the constant velocity joint in the steering knuckle such that the target carrier pilots the subassembly and such that a portion of the subassembly is clamped between the constant velocity joint and said spindle bearing inner race; and
    mounting a sensor probe on the steering knuckle such that the sensor probe senses the encoded target and generates a signal indicative of rotation of a spindle over which the spindle bearing is mounted.

7. The method according to claim 6, wherein the mounting of the sensor probe in the steering knuckle permits removal of the sensor probe from the steering knuckle for service without removing the constant velocity joint from the steering knuckle.

8. The method according to claim 6, wherein the subassembly further comprises a seal fixed to the target carrier and in engagement with the capturing cup.

9. The method according to claim 6, wherein the subassembly further comprises a seal fixed to the capturing cup and in engagement with the target carrier.

10. The method according to claim 6, wherein the sensor probe is mounted in an aperture of the steering knuckle and extends through the steering knuckle to a location proximate to the encoded target.

11. The method according to claim 6, wherein the encoded target is a magnet and the probe means senses a magnetic field produced by the magnet to generate a signal indicative of rotation.

12. The method according to claim 6, wherein the probe means is a variable reluctance sensor.

13. A method of mounting a sensor system for use with an antilock brake, constant velocity joint, wheel spindle, spindle bearing and steering knuckle, the method comprising:
    providing a subassembly including an encoded target and a target carrier;
    mounting the subassembly on an outer surface of said constant velocity joint before the constant velocity joint is installed in said steering knuckle;
    installing the constant velocity joint in the steering knuckle; and mounting a sensor probe on the steering knuckle such that the sensor probe senses the encoded target and generates a signal indicative of rotation of said wheel spindle over which said spindle bearing is mounted.

14. The method according to claim 13, wherein the subassembly further comprises a seal and wherein the installing of the constant velocity joint in the steering knuckle effects engagement of the steering knuckle by the seal.

15. The method according to claim 13, wherein the sensor probe is mounted in an aperture of the steering knuckle and extends through the steering knuckle to a location proximate to the encoded target.

16. The method according to claim 13, wherein the encoded target is a magnet and the probe means senses a magnetic field produced by the magnet to generate a signal indicative of rotation.

17. The method according to claim 13, wherein the probe means is a variable reluctance sensor.

18. A sensor system for use with an antilock brake, constant velocity joint, wheel spindle, and steering knuckle, the sensor system comprising:
an encoded target;
target mounting means, adapted to be mounted on an outer surface of said constant velocity joint for mounting the encoded target for rotation with said wheel spindle fixed to the constant velocity joint; and
probe means, adapted to be mounted on said steering knuckle and in proximity to the encoded target, for sensing the encoded target and for producing a signal indicative of rotation of the wheel spindle.

19. The sensor system according to claim 18, wherein the probe means is removable from the steering knuckle for service without removal of the constant velocity joint from the steering knuckle.

20. The sensor system according to claim 18, further comprising a seal mounted on the target carrier such that the seal is engageable with the steering knuckle when the constant velocity joint is installed within the steering knuckle.

21. The sensor system according to claim 18, wherein the mounting means includes a target carrier comprising a metal ring configured to fit against an outer surface of the constant velocity joint.

22. The sensor system according to claim 18, wherein the encoded target is a magnet and the probe means senses a magnetic field produced by the magnet to generate a signal indicative of rotation.

23. The sensor system according to claim 18, wherein the probe means is a variable reluctance sensor.

24. The sensor system according to claim 18, wherein the encoded target, the target mounting means and the probe means are adapted to be installed axially, with respect to the constant velocity joint, as a single unit on the constant velocity joint.

* * * * *